United States Patent [19]

Miyauchi

[11] 4,355,318
[45] Oct. 19, 1982

[54] LASER RECORDING MONITORING SYSTEM

[75] Inventor: Akio Miyauchi, Asaka, Japan

[73] Assignee: Fuji Photo Film Co., Ltd., Minami-ashigara, Japan

[21] Appl. No.: 213,906

[22] Filed: Dec. 8, 1980

[30] Foreign Application Priority Data

Dec. 27, 1979 [JP] Japan ............................ 54-171915
Dec. 27, 1979 [JP] Japan ............................ 54-171916

[51] Int. Cl.$^3$ ............................................ G01D 15/14
[52] U.S. Cl. ............................ 346/76 L; 369/54; 358/342
[58] Field of Search ............... 346/108, 766; 358/127, 358/128.5, 128.6; 369/53, 54

[56] References Cited

U.S. PATENT DOCUMENTS

| 3,452,331 | 6/1969 | Barlett .............................. 346/76 L |
| 4,125,842 | 11/1978 | Ohnishi et al. .............. 346/76 L X |
| 4,225,873 | 9/1980 | Winslow ........................... 346/76 L |

OTHER PUBLICATIONS

*Soviet Journal of Optical Technology*, Mar. 1979, pp. 180-181, Valis, "Laser Apparatus for Recording the Transparencies of Read-Only Memories."

*Primary Examiner*—G. Z. Rubinson
*Assistant Examiner*—W. J. Brady

[57] ABSTRACT

A heat-mode recording medium has a recording layer the optical density of which is normally high and is reduced significantly by fusing to permit light to pass therethrough when exposed to a laser beam. A laser beam modulated in accordance with data signals is caused to scan the heat-mode recording medium to record information as a pattern of the points made transparent. Errors in the recorded information resulting from any pin hole in the recording medium which permits light to pass therethrough or any foreign material in the recording medium which prevents the recording layer from being fused completely are revealed by a photo-electric converter which receives light passing through the recording medium and outputs electric signals in accordance with the light received and a comparator which compares the electric signals with the data signals and outputs an electric signal when they differ from each other.

1 Claim, 8 Drawing Figures

LASER RECORDING MONITORING SYSTEM

BACKGROUND OF THE INVENTION

1. Field of the Invention

This invention relates to a laser recording monitoring system for monitoring a record on a heat-mode recording medium recorded by a modulated laser beam.

2. Description of the Prior Art

There has been known a recording method in which a laser beam modulated in accordance with data signals is caused to scan a heat-mode recording medium. The heat-mode recording medium includes a recording layer the optical density of which is normally high and is reduced significantly when the recording layer is exposed to a high energy beam such as a laser beam. For example, there has been known such a recording medium having a recording layer the exposed part of which is fused or evaporated by the heat produced by the laser beam to permit light to pass therethrough. The heat-mode recording material typically comprises a transparent base film of glass, polyethylene terephthalate or the like, and a recording layer of high optical density containing therein metal, semimetal or the like. The heat-mode recording medium may further include a protecting layer, a light absorbing layer, a reflection preventing layer and a primer layer. These layers are well known in the art and are disclosed in detail in Japanese Patent Application Laid Open Nos. 51(1976)-78236, 52(1977)-20821 and 53(1978)-83617.

Information is recorded on the heat-mode recording medium as a pattern of parts made to permit light passing therethrough.

When the head-mode recording medium has a pin hole or foreign materials in or on the recording layer thereof, incorrect information may be recorded on the recording medium since the pin hole permits light to pass therethrough even if the part of the recording layer is not exposed to the recording laser beam and the foreign material prevents the part of the recording layer from being fused or evaporated by the heat produced by the laser beam. The record on the heat-mode recording medium cannot be corrected. Thus, a monitoring system for monitoring the record on the heat-mode recording medium becomes necessary.

Japanese Patent Application Laid Open No. 51(1976)-109851 discloses a system for accomplishing such monitoring. In this system, a laser beam for monitoring is caused to scan along with the modulated laser beam for recording so that both the beams simultaneously impinge on one and the same point of the recording medium. The laser beam for monitoring is not modulated and has a wave length different from that of the modulated laser beam for recording. The monitoring laser beam component is extracted from the reflected light and is converted into electric signals for monitoring. This system inherently involves use of an additional laser source and additional optical systems, thereby making the overall laser recording system more complicated, larger and more expensive.

SUMMARY OF THE INVENTION

In light of the foregoing observations and description, the primary object of the present invention is to provide a monitoring system for monitoring a record in a heat-mode recording medium which is simple in its construction.

Another object of the present invention is to provide a monitoring system for monitoring a record on a heat-mode recording medium which is capable of detecting defects in the recording medium.

The monitoring system of the present invention comprises a photo-electric converting means which receives light passing through the heat-mode recording medium and outputs electric signals, and a comparator means which compares the electric signals with the data signals for modulating the recording laser beam and outputs a signal when the former deviates from the latter (This signal will be referred to as "a deviation signal" hereinafter.).

The deviation signals are used to control the laser recording system to stop it, to skip over the recording part of the recording medium having any defect, to write error signals on the recording layer or to memorize the address of the defective part of the recording medium.

In accordance with another aspect of the present invention the recording laser beam is not completely blocked during non-recording periods, i.e., when passing over parts of the recording medium not to be exposed to the recording laser beam, and is only lowered in its energy level to such a level that recording is not be effected. When there is a pin hole in the recording medium, the attenuated laser beam passes through the recording medium. Accordingly, by receiving the laser beam passing through the recording medium, it is possible to detect whether or not the recording medium has a pin hole or the like. Further, the attenuated laser beam also acts as biasing light and serves to preheat the recording material. As is well known in the art, the laser recording is effected by changing the optical characteristics of the heat-mode recording medium by the heat produced by the laser beam. The optical characteristics of the heat-mode recording medium is changed only when the energy level of the laser beam is higher than the threshold level. However, by preheating the recording medium, the recording can be effected in a desirable manner. In order to change the energy level of the laser beam, an acousto-optic light modulator can be used. When recording is to be effected, the acousto-optic light modulator permits the recording laser beam to travel rectilinearly without being modulated, while, when recording is not to be effected, the acousto-optic light modulator polarizes a part of the recording laser beam thereby permitting only the remaining part of the recording laser beam having an energy level lower than the threshold level to travel rectilinearly to reach the recording medium.

In accordance with still another aspect of the present invention, a detecting light beam is used to detect, prior to recording, any defect in the recording layer of the recording medium such as a pin hole which permits light to pass through the recording layer irrespective of whether or not the recording layer has been exposed to the recording laser beam. The detecting light beam is caused to scan the recording medium along with the recording laser beam and at least a part of the detecting light beam is caused to impinge on the part of the recording medium in front of the part on which the recording laser beam impinges with respect to the direction of the scan. The light passing through the recording medium through any pin hole that may be present and through the recorded part of the recording medium is received by a photo-electric converter. The photo-electric converter outputs electric signals in accordance with the received light. The electric signals are compared with the data signals for modulating the recording laser beam by a comparator. The comparator compensates for the gap in time between the recording laser beam and the detecting light beam due to the fact that the latter runs ahead of the former. The comparator outputs a deviation signal when said electric signals from the photo-electric converter deviate from the data signals.

DESCRIPTION OF THE PREFERRED EMBODIMENTS

Figure 1:
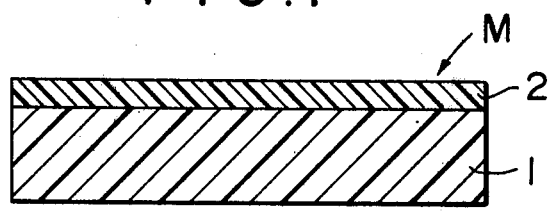
FIG. 1 is an enlarged cross sectional view showing a typical heat-mode recording medium before exposure to the recording laser beam.
Figure 2:
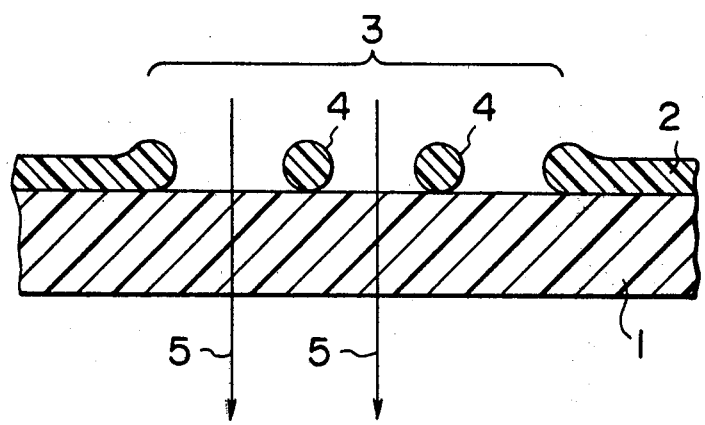
FIG. 2 is a view similar to FIG. 1 but showing the condition after exposure to the recording laser beam, FIG. 3 schematically shows a laser recording system incorporating a monitoring system in accordance with an embodiment of the present invention, FIG. 4 schematically shows a laser recording system incorporating a monitoring system in accordance with another embodiment of the present invention, FIG. 5 schematically shows a laser recording system incorporating a monitoring system in accordance with still another embodiment of the present invention.

As shown in FIG. 1, a typical heat-mode recording medium M comprises a transparent base film 1 of polyethylene terephthalate or glass, and a recording layer 2 containing therein metal, semi-metal or the like. The recording layer 2 ordinarily has high optical density and does not permit light to pass therethrough. When the recording layer is exposed to a laser beam, the exposed part of the recording layer 2 is fused by the heat of the laser beam and, as shown in FIG. 2, forms small spheres 4 due to the surface tension thereof. The part 3 of the recording layer 2 around the spheres 4 is thus removed from the recording medium M to permit light 5 to pass therethrough. Accordingly, information can be recorded on the heat-mode recording medium M as a pattern of the parts thus removed from the recording layer 2 by scanning the recording medium M with a modulated laser beam.

However, if the recording medium M contains foreign materials in or on the recording layer 2 thereof, there is a possibility that the part of the recording layer 2 where the foreign material is present will not be completely fused upon exposure to the laser beam, whereby incorrect information is recorded. Further if the recording medium M has a pin hole or the like in a part of the recording layer 2 which should not be exposed to the laser beam, this will also lead to incorrect recording of information. Therefore, it is necessary to monitor the recording.

Figure 3:
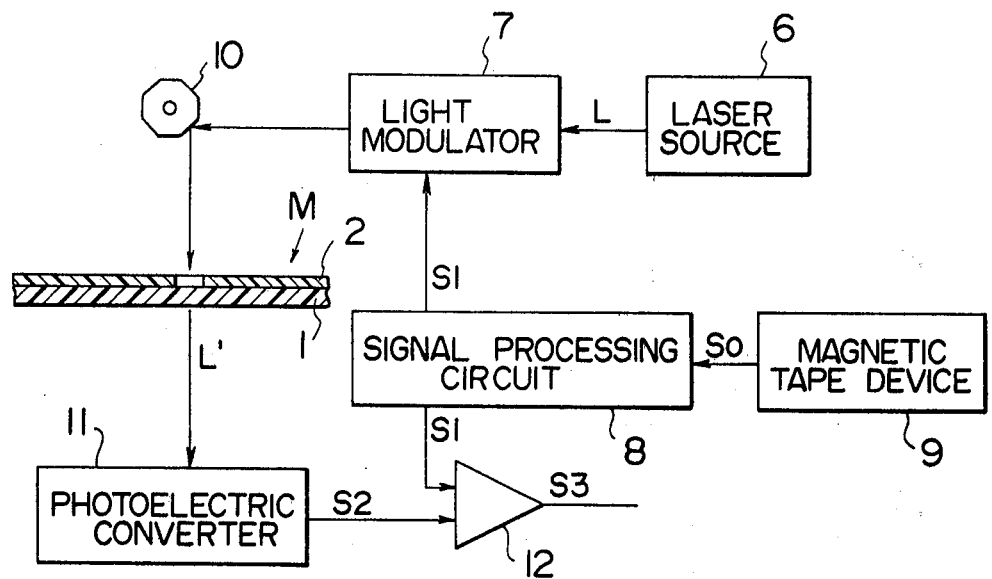

FIG. 3 schematically shows a laser recording system incorporating a monitoring system in accordance with an embodiment of the present invention.

In FIG. 3, a laser beam L emitted from a laser source 6 is modulated by a light modulator 7. The modulator 7 is connected to a signal processing circuit 8 which is in turn connected to a magnetic tape device 9 storing information. The signal processing circuit 8 receives data signals S0 from the magnetic tape device 9 and processes the data signals S0 to obtain processed data signals S1. The light modulator 7 is controlled according to the processed data signals S1 to turn the laser beam L on and off. The modulated laser beam L is caused to scan a heat-mode recording medium M by means of a rotating polygonal mirror 10 to effect recording. When a part of the recording layer 2 of the heat-mode recording medium M is exposed to the laser beam L (when the laser beam is turned on), the part permits a part of the laser beam L to pass therethrough as indicated at L' in the manner described above referring to FIG. 2. The light L' passing through the recording medium M is received by a photo-electric converter 11 disposed behind the recording medium M. The photo-electric converter 11 outputs a signal S2 corresponding to the light L'. The signal S2 is fed to one input terminal of a comparator 12, the other input terminal of which is connected to the signal processing circuit 8. The signal processing circuit 8 feeds to the comparator 12 signals identical to the signals S1 which are used to control the light modulator 7. The comparator 12 compares the signals S2 with the signals S1. When the signal S1 indicates that the laser beam L should be turned on, then recording should be effected and the photo-electric converter 11 should receive light passing through the recording medium M, while, when the signal S1 indicates that the laser beam L should be turned off, then recording should not be effected and no light should reach the photo-electric converter 11. Accordingly, the signals S1 and S2 should be essentially equal to each other. In other words, when the signal S2 deviates or differs from the signal S1, this indicates that the recording is incorrect. For example, when foreign materials are contained in the recording layer of the recording medium M or are deposited on the surface of the recording layer, the part of the recording layer where foreign material is present may not be fused completely even if exposed to the laser beam L. Accordingly, the photo-electric converter 11 would receive no light. In this case, the signal S2 outputted from the photo-electric converter 11 differs from the signal S1.

When the signal S2 differs from the signal S1, the comparator 12 outputs a deviation signal S3.

Figure 4:
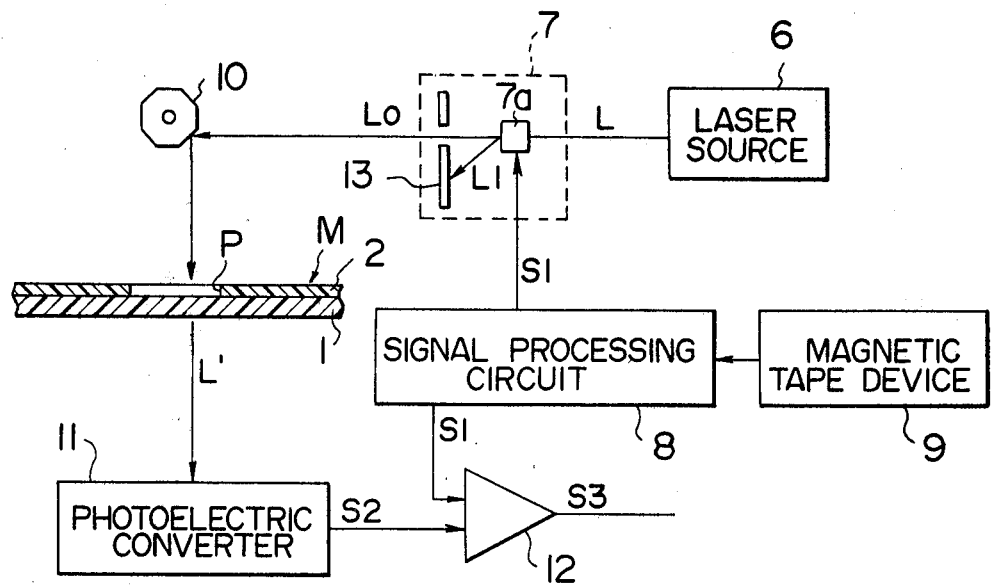

FIG. 4 schematically shows a laser recording system incorporating a monitoring system in accordance with another embodiment of the present invention.

The system shown in FIG. 4 is similar to that of FIG. 3. In FIG. 4, parts analogous to parts of the system of FIG. 3 are indicated by the same reference numerals.

In the system shown in FIG. 4, the light modulator 7 includes an acousto-optic light modulator 7a. The acousto-optic light modulator 7a is controlled by the signal S1 fed from the signal processing circuit 8 to permit the whole laser beam L from the laser source 6 to travel rectilinearly along a path L0 and to polarize the laser beam L so that a part thereof travels along a path L1 and only a part thereof travels along the path L0. When the whole laser beam L is permitted to travel along the path L0, the energy level of the beam reaching the recording medium M is sufficient to effect recording, while, when the laser beam L is polarized, the energy level of the beam reaching the same is not sufficient to effect recording.

Accordingly, non-recording parts of the recording medium on which no recording should be effected is exposed to the laser beam of the lowered energy level. When the non-recording part of the recording medium bears a pin hole P, the lowered energy laser beam passes through the pin hole to be received by the photo-electric converter 11. The photo-electric converter 11 outputs a signal S2 upon receipt of the light and feeds the signal S2 to the comparator 12. The comparator 12 compares with the signal S2 with the signal S1. If the photo-electric converter 11 receives the attenuated laser beam, the signal S2 inherently differs from the signal S1 and the comparator 12 outputs a deviation signal S3. This indicates that the non-recording part of the recording medium M has a pin hole P. Further, the attenuated laser beam also acts as a biasing light and serves to preheat the recording medium M, though it does not effect recording. In this connection the energy of the attenuated laser beam should not be sufficient to effect recording but should be sufficient to heat the part of the recording layer around the exposed part. Said polarized part of the laser beam is confined in the light modulator 7 by means of a light shielding plate 13.

Figures 5, 6:
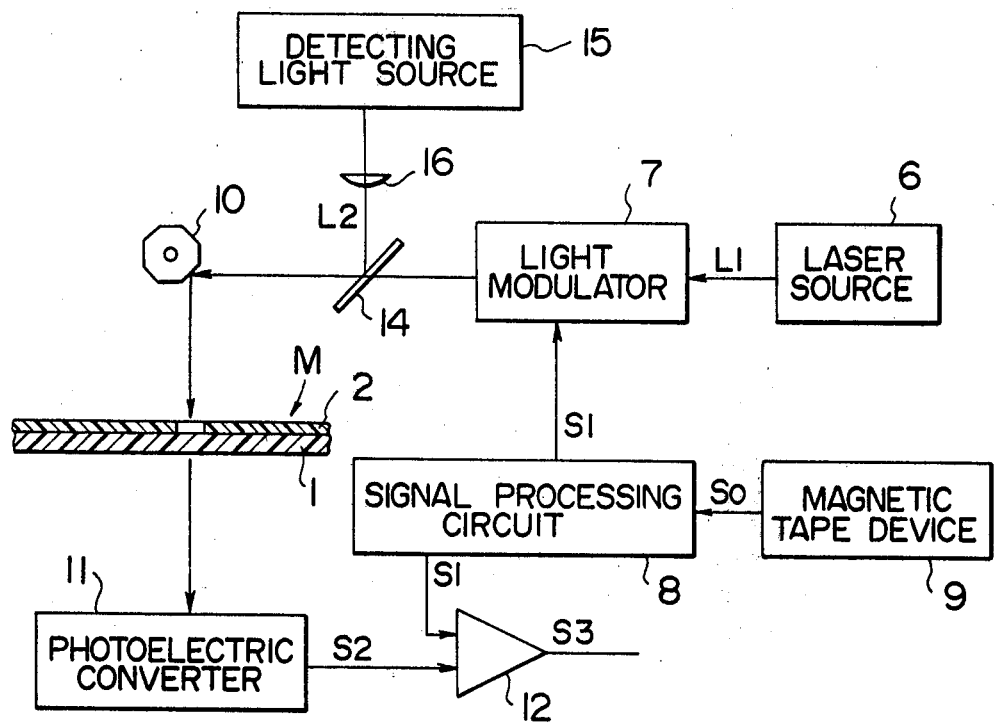
FIG. 6 is a view for illustrating the relationship between light spots formed on the recording medium by the recording laser beam and the detecting light beam in the system of FIG. 5, and FIGS. 7A and 7B illustrate the relationship between the data signals and the electric signals outputted from the photo-electric converter in the system of FIG. 5.

FIG. 5 schematically shows a laser recording system incorporating a monitoring system in accordance with still another embodiment of the present invention. The system shown in FIG. 5 is identical with the system shown in FIG. 3 except that an additional light source for detecting pin holes or the like is provided. The monitoring system of this embodiment can detect a pin hole or the like in the recording layer of the recording medium prior to recording on the part of the recording layer at which the recording layer has the pin hole.

In FIG. 5 a half-silvered mirror 14 is inserted into the optical path of the modulated recording laser beam between the light modulator 7 and the rotating polygonal mirror 10. The half-silvered mirror 14 transmits the modulated recording laser beam therethrough. A detecting light source 15 is disposed above the half-silvered mirror 14.

A detecting light beam L2 emitted from the light source 15 is shaped in its cross section to form a substantially oval light spot by means of a cylindrical lens 16 inserted between the light source 15 and the half-silvered mirror 14. The detecting light beam L2 is reflected by the half-silvered mirror 14 along the optical path of the recording laser beam and is caused to scan the recording medium M together therewith by means of the rotating polygonal mirror 10. As shown in FIG. 6, the recording laser beam forms a circular light spot on the recording medium M, while the detecting light beam forms an oval light spot a part of which is superposed with the circular light spot of the recording laser beam and the rest of which projects therefrom in the direction of the scan. Thus, the projecting part of the oval light spot always precedes the circular light spot during scanning.

The photo-electric converter 11 is disposed behind the recording medium to receive light passing through the recording medium at the part covered by both light spots, if any. As in the embodiment of FIG. 3, the photo-electric converter 11 outputs electric signals S2 in accordance with the received light and feeds the electric signals S2 to the comparator 12. The comparator 12 compares the electric signals S2 with the data signals S1 to output a deviation signal when they differ from each other.

Figure 7A:
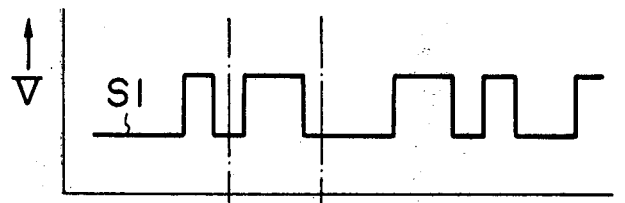
Figure 7B:
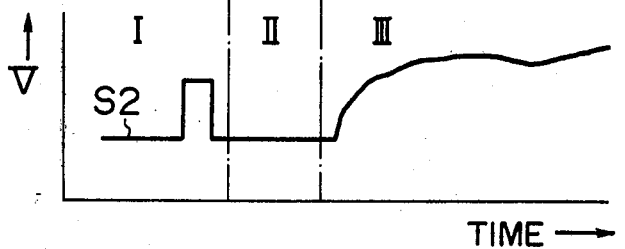

Assuming that the data signals S1 are as shown in FIG. 7A and the electric signals S2 are as shown in FIG. 7B, region (I) indicates that recording is precisely effected, region (II) indicates that the part of the recording layer covered by the circular light spot of the recording laser beam is not completely fused, i.e., recording is not effected, due to existence of foreign materials in or on the recording layer, for example, and region (III) indicates that either the part of the recording layer covered by the circular light spot of the recording laser beam or the part covered by the oval light spot of the detecting light beam has a pin hole or the like.

The comparator 12 outputs a deviation signal S3 in case that the relation between the signals S1 and S2 is as shown in the region (II) or (III).

The detecting light source 15 may be a light emitting diode, a laser or the like.

When the intensity of the light received by the photo-electric converter 11 is too high, it is preferred that the intensity be weaken using a suitable optical filter.

Further, in the above embodiments, the recording laser beam is caused to scan the recording medium by means of a rotating polygonal mirror. However, the recording medium may be moved instead.

I claim:

1. A monitoring system for monitoring laser beam recording, in which a recording laser beam is modulated in accordance with data signals representing information and the modulated laser beam is caused to scan a heat-mode recording medium to record the information thereon as a pattern of parts the optical density of which is reduced to permit light to pass therethrough upon being exposed to the recording laser beam, said monitoring system comprising:

a photo-electric converting means which receives light passing through the heat-mode recording medium and outputs electric signals in accordance with the received light, a detecting light source which emits a detecting light beam, and means for causing the detecting light beam to scan said heat-mode recording medium along with the modulated laser beam, at least a part of the spot formed on the heat-mode recording medium by the detecting light beam preceding the spot formed by the recording laser beam in the direction of scanning, and a comparator means which compares the electric signals with the data signals and outputs a deviation signal when the former deviate from the latter.

* * * * *